United States Patent
Krakovich et al.

(10) Patent No.: US 6,633,799 B2
(45) Date of Patent: Oct. 14, 2003

(54) CONFIGURABLE SWITCHGEAR SYSTEM

(75) Inventors: Alexander Krakovich, Whitefish Bay, WI (US); Keith S. Ruh, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 348 days.

(21) Appl. No.: 09/738,708

(22) Filed: Dec. 15, 2000

(65) Prior Publication Data

US 2002/0128748 A1 Sep. 12, 2002

(51) Int. Cl.[7] .............................. G05D 3/12; G05D 5/00; G05D 9/00; G05D 11/00; H02J 1/10; H02J 3/38; H02J 9/00; H02J 1/00; H02J 3/00
(52) U.S. Cl. .......................... 700/286; 307/18; 307/23; 307/64; 307/80; 307/85
(58) Field of Search ................................ 700/286, 297, 700/298, 22; 307/64, 80, 85, 18, 23, 19, 21, 25, 86

(56) References Cited

U.S. PATENT DOCUMENTS

| | | | |
|---|---|---|---|
| 4,731,547 A | * 3/1988 | Alenduff et al. | 307/85 |
| 5,070,252 A | * 12/1991 | Castenschiold et al. | 307/64 |
| 5,754,033 A | 5/1998 | Thomson | |
| 6,157,874 A | * 12/2000 | Cooley et al. | 700/295 |
| 6,404,075 B1 | * 6/2002 | Potter et al. | 307/64 |
| 6,442,452 B1 | * 8/2002 | Kopke | 700/292 |

\* cited by examiner

Primary Examiner—Leo Picard
Assistant Examiner—Ryan Jarrett
(74) Attorney, Agent, or Firm—Quarles & Brady LLP

(57) ABSTRACT

A switchgear system, as well as a method of controlling a switching status of two switches in a switchgear system, are disclosed. The switchgear system includes a first switch capable of electrically coupling a first power source and a load, and a second switch capable of electrically coupling a second power source and the load. The switchgear system further includes a control unit coupled to both the first and second switches. The control unit includes a memory that stores software, and the control unit is capable of operating in at least two modes and controlling opening and closing of the first and second switches in accordance with those modes based upon the software. The switchgear system additionally includes an operator interface coupled to the control unit. The operator interface is capable of receiving additional information that enables the operation of the control unit in at least one of the at least two modes.

20 Claims, 3 Drawing Sheets

CONFIGURABLE SWITCHGEAR SYSTEM

FIELD OF THE INVENTION

The present invention relates to power control systems and, in particular, relates to switchgear systems employed to control the coupling of one or more power sources to a load and to one another.

BACKGROUND OF THE INVENTION

Switchgear systems are widely used by customers of utilities to determine whether and when power is provided to the customers' loads from the utilities or power grid, or from other power source(s) that are under the control of the customers. Depending upon the situation, customers may desire that all of their power is provided from the utilities, that all of their power is provided from their own power sources(s), or that power is jointly provided from both types of power sources. When power is jointly provided from both types of sources, the switchgear systems also are capable of determining the relative amounts of power provided from each of the two types of power sources. Further, switchgear systems allow customers to supply power that is produced by their own power sources back to the utilities or power grid, for which the customers are paid.

A switchgear system typically determines whether power is provided from the utility to the customer load, or from a customer power source to the load or back to the utility, by controlling the opening and closing of circuit breakers to establish or break connections between the utility, load, and customers power source. In a conventional two-breaker switchgear system, an outside power line carrying power from a utility is coupled to a customer load by way of a first circuit breaker, and the customer load is further coupled by way of a second circuit breaker to the customer power source, which is often a generator set ("genset"). When both the first and second circuit breakers are closed, power can be supplied to the load from both the utility and the customer power source, or from the customer power source back to the utility. When only the first or second circuit breaker is closed, all power being supplied to the load comes from the utility or customer power source, respectively.

Not all switchgear systems allow the direct coupling of a customer power source to the utility power grid. Indeed, early switchgear systems avoided the simultaneous coupling of the two sources to one another. When it was desired to switch from supplying utility power to the load to supplying customer power to the load, or vice-versa, this transfer was accomplished by first decoupling the power source that was originally supplying power to the customer load prior to coupling the other power source to the load. This basic mode of transfer of the load(the "open transition transfer"), however, is typically undesirable insofar as there is at least a short period of time in which no power source is providing power to the load. Further, switchgear systems that are only configured to perform open transition transfers do not have the capability of coupling the customer power source to the power grid for the purpose of providing power to the power grid.

Thus, modern switchgear systems typically have the capability of coupling a customer power source directly to the utility power grid. In the case where such a switchgear system is switching between providing all power to the load from the utility and providing all power from a customer power source, or vice-versa, there is a period of time in which both the utility and the customer power source are coupled to one another and coupled to the load. This is desirable insofar as it allows for seamless transitioning between power sources from the perspective of the load. Where the period of time during which both sources are coupled to one another is relatively short, this mode of transfer is called a "closed transition transfer"; where the period of time is longer, and the relative contributions of power from the two power sources are respectively increased and decreased slowly with respect to one another during that period of time, this mode of transfer is called a "soft load transfer" or "load-ramping transfer."

However, in order to provide for closed transition or soft load transfers, the complexity of the design of a switchgear system becomes greatly increased. In addition to controlling the timing of the opening and closing of the circuit breakers, the switchgear system must additionally control the operation of the customer power source so that the power output of that power source becomes synchronized with the power of the utility power grid. That is, before the switchgear system can close both of the circuit breakers so that the customer power source is coupled directly to the power grid, the switch gear system must determine that the customer power source is providing power of the same amplitude, frequency and phase of the power provided by the power grid.

In addition to the complexity associated with performing closed transition or soft load transfers, modern switchgear systems are further complicated because the switchgear systems are often designed to perform switching transfers (or to otherwise change the switching status of the circuit breakers) only under certain specified conditions. For example, a standard switchgear system is often designed to usually maintain the connection between the utility and the customer load in a normal mode of operation, and to only break this connection when there is an emergency condition rendering the utility power unavailable, in response to which the switchgear system transfers the load to the customer power source in an emergency standby mode of operation. Another type of switchgear system is designed to leave the normal mode of operation and enter an interruptible rate (or curtailable power) mode of operation whenever the amount of power from the utility exceeds a certain level (or some related quantity such as price exceeds a certain level), or whenever the utility provides a command to do so.

An additional type of switchgear system is designed to operate so that the utility supplies all power required by the load in a normal mode of operation until the amount of power (or total power cost) exceeds a certain level, at which time the switchgear system enters a peak shaving mode of operation and causes the customer power source to become also coupled to the load. The customer power source then supplies any additional power that is needed above the level. A further type of switchgear system is designed to allow a customer power source to supply power back to the power grid, in an export-to-utility mode of operation. Moreover, some switchgear systems are designed to perform certain transfers or other switching operations only in response to commands or information from outside sources such as the utility. Designing a switchgear system to operate in any one of these modes of operation, or in response to different commands or other information, further increases the complexity of the switchgear system.

Although conventional switchgear systems do exist for performing each of the above-described types of functions, such conventional switchgear systems are typically hard-wired and custom-designed for use with specific respective customer power sources, loads and applications, and each such switchgear system is typically restricted to performing a particular respective type of transfer or other switching operation, and to operating in a particular respective mode. That is, conventional switchgear systems, due to their being hardwired and custom-designed, are inflexible in terms of the degree to which their operation can be varied to more appropriately fit changing operational circumstances.

It would therefore be advantageous if a switchgear system was developed in which the operation of the switchgear system could be varied to suit changing operational circumstances. It would further be advantageous if such a switchgear system was, in particular, sufficiently flexible to operate in a variety of modes and to perform a variety of different types of transfers, and other switching operations and to operate both in response to and independently of commands or information from outside sources. It would additionally be advantageous if the switchgear system could be caused to vary in its operation only under limited circumstances, in order to reduce the chance that an operator would inadvertently cause the switchgear system to operate in an unintended and inappropriate manner.

SUMMARY OF THE INVENTION

The present inventors have discovered that it is possible to design a flexible, configurable switchgear system that can operate in a variety of modes, perform a variety of different types of transfers and other switching operations, and operate both in response to and independently of commands or information from outside sources. To allow for maximum flexibility, the switchgear system is at least partly implemented using software that includes the necessary programming and related information for allowing the switchgear system to operate in such a variety of modes and manners. To guarantee that the switchgear system operates in the proper mode and performs the proper transfers or other switching operations for a given operational situation, the configurable switchgear system further includes an operator interface by which the operator must provide specific information to access and enable the proper mode and switching operations. In the preferred embodiment of the invention, the operator interface includes a port at which a plug-in card or cartridge storing the necessary information can be inserted.

More particularly, the present invention relates to a switchgear system. The switchgear system includes a first switch capable of electrically coupling a first power source and a load, and a second switch capable of electrically coupling a second power source and the load. The switchgear system further includes a control unit coupled to both the first and second switches. The control unit includes a memory that stores software, and the control unit is capable of operating in at least two modes and controlling opening and closing of the first and second switches in accordance with those modes based upon the software. The switchgear system additionally includes an operator interface coupled to the control unit. The operator interface is capable of receiving additional information that enables the operation of the control unit in at least one of the at least two modes.

The present invention further relates to a control system for controlling the switching status of a switch in a switchgear system. The control system includes a first means for storing primary information concerning a plurality of modes of operation regarding the controlling of the switching status. The control system additionally includes a second means for providing a signal to control the switching status in accordance with one of the plurality of modes. The second means provides the signal based upon a subset of the primary information corresponding to the one mode. The control system further includes a third means capable of receiving secondary information from an outside source. The secondary information determines which subset of the primary information is the basis for the signal.

The present invention further relates to a method of controlling a switching status of two switches in a switchgear system. The method includes providing a controller with an interface, and an internal memory in which is stored primary software concerning a plurality of operational modes regarding the controlling of the switching status of the two switches. The method additionally includes coupling a first memory device including secondary software to the interface of the controller. The secondary software causes an activation of a first subset of the primary software concerning a first of the operational modes. The method further includes generating a first control signal to change the switching status of at least one of the switches in accordance with the first subset of the primary software. The method additionally includes replacing, at the interface, the first memory device with a second memory device including tertiary software. The tertiary software causes an activation of a second subset of the primary software concerning a second of the operational modes. The method further includes generating a second control signal to change the switching status of at least one of the switches in accordance with the second subset of the primary software.

DETAILED DESCRIPTION OF THE PREFERRED EMBODIMENT

Figure 1:
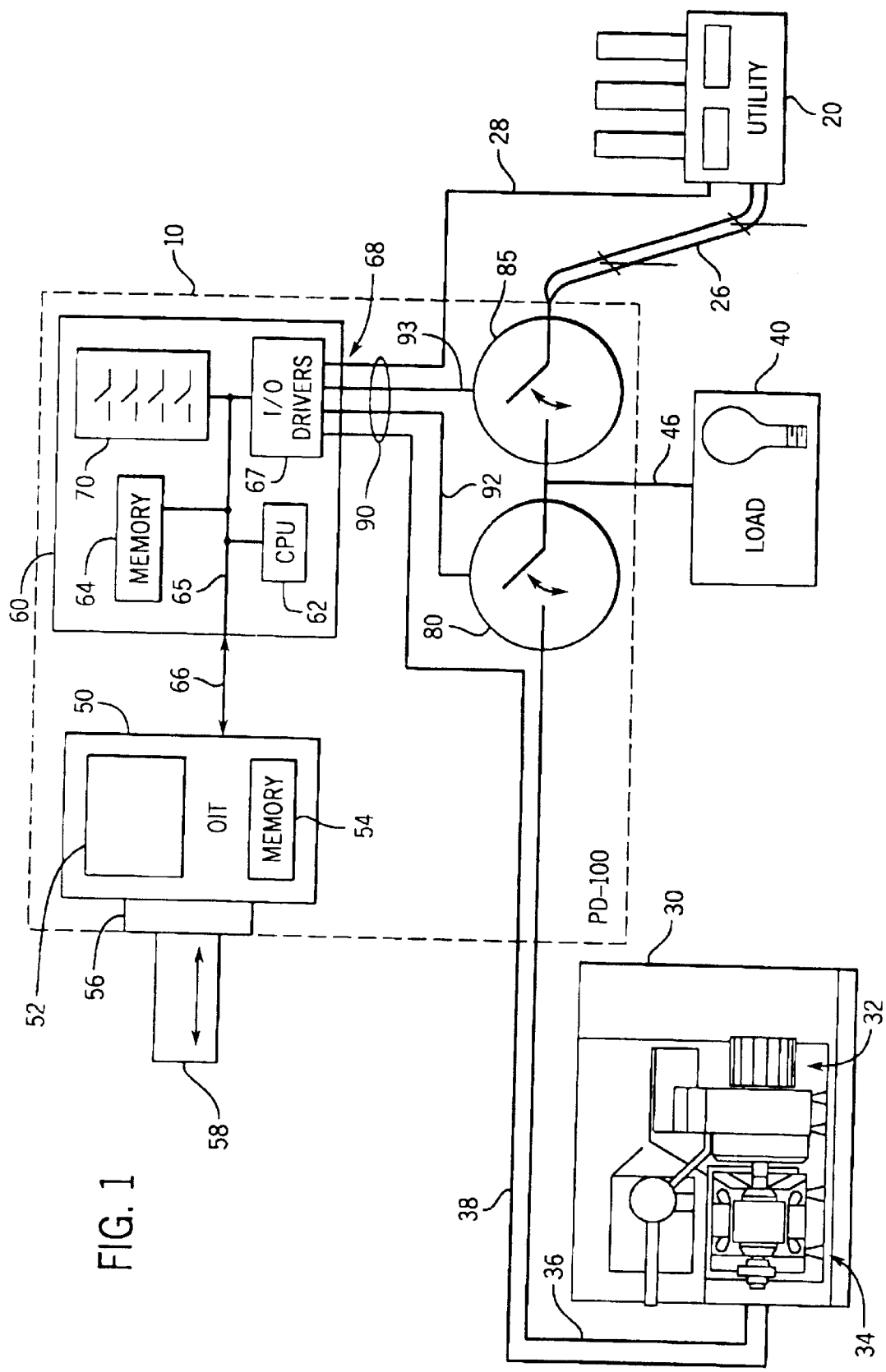
FIG. 1 is a block diagram showing an exemplary configurable switchgear system in accordance with one embodiment of the present invention, which is coupled to a genset, a load, and a utility.

Referring to FIG. 1, a new configurable switchgear system in accordance with the present invention is typically coupled to a utility 20, a generator set (or "genset") 30, and a load 40. The switchgear system 10 operates to determine whether power from the utility 20 is provided to the load 40, whether power from the genset 30 is provided to the load, and/or whether power from the genset 30 is provided to the utility 20 or more generally to the power grid to which the utility is providing power. The switchgear system 10 is coupled to the utility 20 by a power cable or line 26, to the genset 30 by a genset power cable 36, and to the load 40 by a load power cable 46. The genset 30 is shown to be a conventional genset having an internal combustion engine 32 such as the Series 60, Series 2000 or Series 4000 engines manufactured by the Detroit Diesel Co. of Detroit, Mich., as well as an alternator 34, which can be a 3-phase synchronous machine such as the model 5M4027 alternator manufactured by Marathon Electric Co. However, the genset 30 can in alternate embodiments be replaced with different types of gensets or even different types of power sources, such as microturbines or fuel cells.

The switchgear system 10 includes an operator interface terminal ("OIT") 50, a controller 60, a plurality of relays 70, a generator circuit breaker 80, and a utility circuit breaker 85. Based upon control signals provided from the controller 60 to the generator circuit breaker 80, the genset 30 is coupled to or decoupled from the load 40 and, depending upon the status of the utility circuit breaker 85, to and from the utility 20. Likewise, depending upon control signals from the controller 60 to the utility circuit breaker 85, the utility 20 (or power grid) is coupled to or decoupled from the load 40 and, depending upon the status of the generator circuit breaker 80, to and from the genset 30. The circuit breakers 80, 85 can be any one of a number of different types of circuit breakers, for example, the Masterpact® universal power circuit breaker manufactured by Square D Co. of Cedar Rapids, Iowa. The exact operation of the switchgear system 10 in controlling the circuit breakers 80, 85 is discussed further below.

The OIT 50 preferably includes a touchscreen 52 for providing information to an operator or receiving commands from an operator, although in alternate embodiments other types of interfacing devices can be employed such as a computer monitor and keyboard or pushbuttons. In the present embodiment, the touchscreen 52 is a MAGELiS® operator terminal model XBTF034*10 touchscreen also manufactured by Square D Co. In addition to the touchscreen 52, OIT 50 also includes a memory 54, and a plug 56 for receiving a plug-in card, cartridge or similar device 58. The plug 56 is configured to receive a variety of different plug-in cards 58. Each particular different card 58 has different information stored on it, typically by way of a memory card such as a PCMCIA memory card.

The OIT 50 is coupled to the controller 60 by way of a communication link 66. The communications across the communication link 66 can proceed according to any one of a number of different protocols known in the art, and in the present embodiment is a Modbus™ communication link. Also, in the present embodiment, the communication link 66 has a protocol in a master/slave format, although in an alternate embodiments this need not be the case. More detail concerning the communication of information between the OIT 50 and the controller 60 over the communication link 66 is provided below.

As shown in FIG. 1, the controller 60 includes a central processing unit ("CPU") 62, a memory 64, and a plurality of protective relays 70. Additionally, the controller 60 includes a plurality of input/output (I/O) ports 68 for communicating with the circuit breakers 80, 85, and a variety of other elements. The I/O ports 68 include a plurality of analog inputs, discrete inputs, analog outputs and discrete outputs as further discussed below. The signals provided and received at I/O ports 68 are provided and received by, respectively, a plurality of corresponding input/output (I/O) drivers 67. In the preferred embodiment, the controller 60 is the Enpower-GPC controller manufactured by Encorp, Inc. of Windsor, Colo.; however, much of the software stored within the memory 64 is special software manufactured by Kohler Co. of Kohler, Wis., which is necessary for the operation of the configurable switchgear system 10 as discussed herein.

The controller 60 controls the performance of a variety of functions of the switchgear system 10. In particular, the controller 60 controls the opening and closing each of the circuit breakers 80, 85, including both whether and when the breakers are opened or closed and the manner or timing in which the breakers are opened or closed. The operation of the controller 60 in this regard is central the operation and purpose of the switchgear system 10 insofar as it concerns, whether and in what manner power is provided to and from the utility 20, from the genset 30, and to load 40. In addition to controlling the circuit breakers 80, 85, the controller 60 also influences the operation of genset 30 by way of a genset communication link 38, and responds to or communicates with the utility 20 by way of a utility communication link 28.

The relays 70 employed in the switchgear system 10 can vary depending on the embodiment. However, typical relays include protective relays such as an over/under voltage relay that provides voltage protection for the genset 30 or the utility 20 by opening the respective circuit breaker 80, 85 when voltage strays outside preset parameters, an over/under frequency relay that provides frequency protection from the genset or the utility by opening the respective circuit breaker 80, 85 when frequency strays outside preset parameters, reverse power relays that provide reverse-power protection for the genset or the utility, and negative phase sequence relays (both voltage and current)that provide protection for the load 40 by opening the utility circuit breaker 85 when the negative phase sequence voltage or current exceeds a preset limit (none of which are shown in FIG. 1). Depending upon the embodiment, additional relays can be employed outside of controller 60 also, in which case the relays are controlled by way of one or more communication links that are coupled to the I/O drivers 67.

The CPU 62 is coupled to the memory 64, to the protective relays 70, and to the plurality of I/O drivers 67 by way of an internal databus 65, which in the preferred embodiment operates according to a pure serial protocol operating in a peer-to-peer format such as LonWorks manufactured by Echelon™. The I/O drivers 67 include a variety of discrete input drivers, discrete output drivers, analog input drivers and analog output drivers. The I/O drivers 67 provide and receive signals at I/O ports 68 that are communicated over multiple communication links 90. Discrete input and output drivers of the I/O drivers 67 are used to communicate information to and from the genset: circuit breaker 80 and the utility circuit breaker 85 over respective communication links 92 and 93. The analog input drivers of the I/O drivers 67 are capable of receiving status information concerning a variety of parameters such as voltage availability, current availability, or engine speed. Depending upon the embodiment, each of the communication links 90 (as well as the internal databus 65 in alternate embodiments) can provide communication by way of any communications protocols known in the art, including serial, parallel, hardware-based or any other type of communications format.

Additionally, the controller 60 provides commands to the genset 30 by way of a discrete output driver and the genset communication link 38. These commands are typically provided directly to an engine governor and voltage regulator (not shown) of the genset 30, although in alternate embodiments the commands can be provided to an intermediate control device such as an engine control module (not shown). The commands in particular allow for the controller 60 to influence the voltage regulator of the genset, which in turn produces changes in the field current of the genset and therefore influences the voltage output by the genset. The commands provided to the genset 30 further allow the controller 60 to control or influence the engine speed of the genset 30, which in turn affects the power output by the genset as well as the frequency of power output by genset. Additional commands allow the controller 60 to start or stop the engine 32.

The communication link 28 between the controller 60 and the utility 20 allows for the utility to provide a signal indicating when it is necessary or desirable for a greater proportion of the load 40 to be satisfied by power output from the genset 30 as opposed to power from the utility 20. Depending upon the embodiment, the communication link 28, which can involve any type of analog, digital, serial, parallel or other type of communications, and be coupled to any one of a number of the discrete and analog input and output ports of the I/O ports 68, can also allow other types of communication between the switchgear system 10 and the utility 20 to occur. In certain embodiments, the utility 20 has the ability to influence the amount and type of power provided by the genset 30 by providing commands to the switchgear system 10, or is able to obtain information regarding the operation of the switchgear system, the genset, or the load 40.

Figure 2:
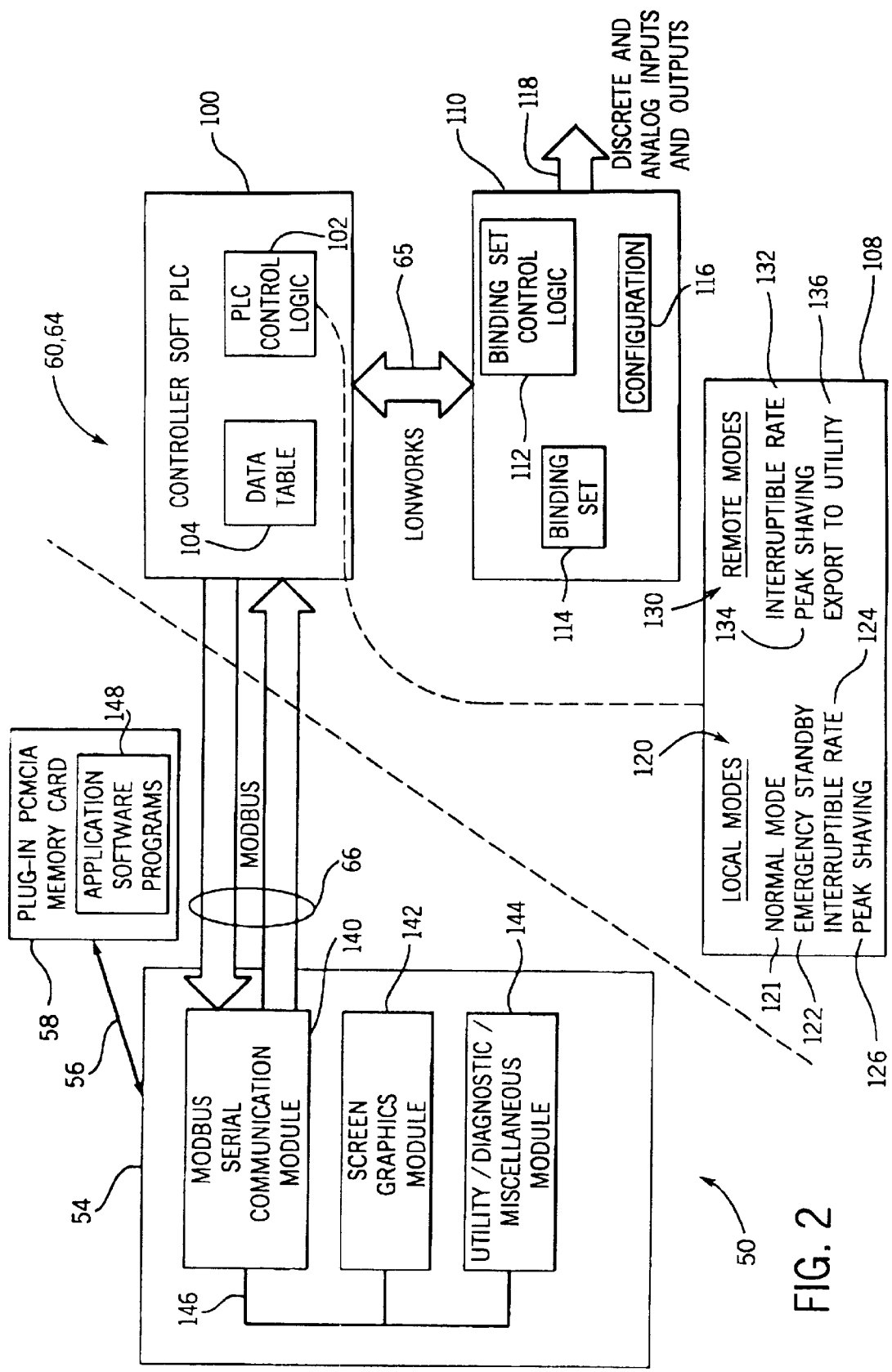
FIG. 2 is a block diagram showing software modules, programs and other information that is employed by the configurable switchgear system of FIG. 1.

Referring to FIGS. 1 and 2, various internal software modules and programs employed by switchgear system 10 include software modules and programs stored in the memory 64 of the controller 60 and also software stored in the memory 54 of the OIT 50 as well as the plug-in card 58. With respect to the software modules stored within the memory 64 of the controller 60, these software modules include a first module 100 relating to a controller soft programmable logic controller ("PLC") that includes PLC control logic software 102 and a data table 104. The software modules additionally include a second module 110 that includes control logic software 112, binding set software 114, and a configuration 116. The software of the second module 110 is used to determine the operation of the discrete and analog input and output drivers of I/O drivers 67. The binding set software 114, PLC control logic software 102 and configuration 116 can be programmed into the controller 60 by way of visual basic, and in the present embodiment are specialized software developed and programmed by Kohler Co. for implementation in the hardware of the controller 60 developed by Encorp, Inc. The information in the software modules 100, 110 can be communicated within the controller 60 by way of the internal databus 65.

The binding set software 114, PLC control logic software 102 and configuration 116 are in the present embodiment used to determine the operation of the controller 60 in controlling the switching on and off of the genset and utility circuit breakers 80, 85 in accordance with a variety of different switching modes, and by way of a variety of different transfers and other switching operations. As discussed further below, in the present embodiment, the controller 60 is capable of controlling the operation of circuit breakers 80, 85 in twelve different modes of operation, although in alternate embodiments a fewer or larger number of modes of operation is possible.

The binding set software 114 in particular determines how the various components of the switchgear system 10 are connected with one another in order to perform the different types of switching operations in the different modes. For example, the binding set software 114 determines how functional elements embodied in software such as a synchronizer, load-sharing module, sync-check module, VAR export module, and zero power transfer modules (not shown) are interconnected for interaction. The PLC control logic software 102 determines the sequence of control operations performed by the controller 60 in order to perform the different switching operations, including the common control operations that are necessary for being able to couple the genset 30 to the utility 20.

The configuration 116 includes various parameters and other data used by the controller 60 to perform the switching operations in the various modes, in accordance with the PLC control logic software 102 and the binding set software 114. The software of software modules 100, 110, such as the binding set control logic 112 and the PLC control logic 102, also allow for monitoring of the power provided to and from the utility 20, information regarding the power being provided by the genset 30, and information regarding the power being provided to the load 40. This information can include information regarding the real power being provided (in kilowatts), the reactive power being provided (in KiloVars), complex power (in kVA), power factor, the volts or amps being provided, the frequencies and/or phases of the voltages or currents being provided, and other quantities.

As shown in block 108, the controller 60 can direct the switchgear system 10 to operate in multiple modes of operation that include a first set of modes ("local modes") 120, and a second set of modes ("remote modes") 130. The controller 60 of switchgear system 10 operates in one of the local modes 120 when the switchgear system 10 is not receiving any control commands or other signals from the utility 20 or any other outside source other than the genset 30 and/or load 40. The controller 60 operates in the remote loads 30 when it is receiving control commands or signals from utility 20 (or some other outside source). The local modes 120 include a normal mode 121, an emergency standby mode 122, an interruptible rate mode 124 and a peak shaving mode 126, while the remote modes 130 include an interruptible rate mode 132, a peak shaving mode 134, and an export-to-utility mode 136.

Each of the local modes 120 and the remote modes 130 correspond to a particular manner of controlling the switching status of the circuit breakers 80, 85 that results in a particular power flow from the utility 20 to the load 40, from the genset 30 to the load, or from the genset to the utility 20, depending upon how the genset and utility power sources are controlled. The default mode in which the utility 20 is able to provide all desired power, the utility circuit breaker 85 is closed, and the genset circuit breaker 80 is open, is the normal mode 121. The normal mode 121 is one of the local modes 120, since in the normal mode the switchgear system 10 is not receiving any signals from outside sources. The protective relays 70 can be used to determine whether the utility 20 is properly providing all desired power such that the switchgear system 10 can remain in the normal mode 121, or whether the power from the utility is outside appropriate setpoints established by the relays, which indicates that there is a problem in the flow of power from the utility.

As discussed further below, the controller 60 switches from the normal mode 121 to the other local modes 120 or remote modes 130 when certain triggering events occur. Although the controller 60 is programmed to be capable of operating in any of the local or remote modes 120, 130, in the preferred embodiment, the actual subset of modes in which the controller 60 will operate depends upon the application software programs 148 stored on the particular plug-in card 58 that is being employed. That is, the particular plug-in card 58 being used at any given time determines how the controller 60 and switchgear system 10 are configured to operate at that time, in terms of their modes of operation and the switching operations they will perform.

With respect to the emergency standby mode 122, assuming that the controller 60 is in the normal mode 121, the controller 60 remains in the normal mode 121 unless and until such time as the utility 20 is unable to provide sufficient power for the load 40 (e.g., a storm produces a failure in the power line 26), at which time the controller 60 enters the emergency standby mode 122. Once in the emergency standby mode 122, the controller 60 causes the utility circuit breaker 85 to open and causes the genset circuit breaker 80 to close, thereby allowing power from the genset 30 to be provided to the load 40. If the genset 30 is not operating at the time the utility 20 is determined to be unable to provide sufficient power, a command is provided to the genset from the controller 60 to start operating, prior to the closing of the genset circuit breaker 80.

With respect to the interruptible rate mode 124, (also known as the curtailable power mode), the controller 60 also operates in the normal mode 121 until a triggering event occurs. The triggering event that causes the controller 60 to enter the interruptible rate mode 124 typically is a determination by the controller that the power being delivered by the utility 20 exceeds a preset level stored in the memory 64 of the controller. Upon entering the interruptible rate mode 124, the controller 60 performs a transfer of the load 40, in which the utility circuit breaker 85 is opened and the genset circuit breaker 80 is closed. As a result of the transfer, the customer system (the switchgear system 10, genset 30 and load 40) operates independently from the utility source. The controller 60 leaves interruptible rate mode 124 and returns to the normal mode 121 when the power required by the load 40 no longer exceeds the preset level. Operation in the interruptible rate mode 124 can reduce the customer's total cost of energy.

With the respect to the peak shaving mode 126, the controller 60 remains in the normal mode 121, and provides power only from the utility 20, until such time as the power levels demanded by the load exceed some maximum level. Upon the power requirements of the load 40 exceeding this maximum level, the controller 60 enters the peak shaving mode 126. Once in the peak shaving mode 126, the genset circuit breaker 80 is closed to allow at least a portion of the power demanded by the load 40 to be supplied by the genset 30, in addition to the power already being provided from the utility 20. By limiting the amount of power that is provided from the utility 20, the overall power costs can be reduced, since the excessively high energy prices associated with power being provided in amounts greater than the maximum level are avoided.

The controller 60 can exit the peak shaving mode 126 when the power levels demanded by the load no longer exceed the maximum level or fall below some other level. Upon the power levels falling below such a level, the controller 60 reduces the power being provided by the genset 30 (e.g., in linear fashion) until such time as the genset circuit breaker 80 can be opened, after which the controller 60 returns to the normal mode 121. Depending upon the particular embodiment of the peak shaving mode 126, the relative power contributions from the utility 20 and the genset 30 during operation in the peak shaving mode can vary. In one embodiment, the switchgear system 10 controls the genset 30 so that the power contribution from the utility 20 is capped and the genset provides the remaining amount of power required by the load 40. In a second embodiment, the power contribution from the genset 30 is capped, and the utility 20 provides any remaining power that is required.

Referring to the remote modes 130, one of the remote modes is the interruptible rate mode 132, which operates in much the same way as the interruptible rate mode 124 of the local modes 120, except insofar as the change to the interruptible rate mode and resulting discontinuation of power from the utility 20 occurs after the utility provides a signal to the switchgear system 10 by way of communication link 28. The signal, which is indicative of a desire on the part of the utility 20 to reduce or limit its power output to the load 40, can be as simple as a contact closure. However, in alternate embodiments, the communication between the utility 20 and the switchgear system 10 can become more complicated and involve building automation or SCADA (System Control and Data Acquisition) systems. As with the interruptible rate mode 124, the controller 60 returns to the normal mode 121 from the interruptible rate mode 132 once the signal from the utility 20 is no longer provided.

With respect to the peak shaving mode 134 of the remote modes 130, this mode is also similar to the peak shaving mode 126 of the local modes 120, except insofar as the peak shaving only occurs when a signal is provided from the utility 20. The signal provides an indication that the power level demanded by the load 40 has exceeded some threshold, such that the controller 60 then determines production and delivery of power by the genset 30 to the load 40 to be justified. Depending upon the embodiment, the signal provided by the utility 20 can provide different types of information that allows the controller 60 to determine that peak shaving is appropriate. The controller 60 exits the peak shaving mode once the signal from the utility 20 is removed or changed, indicating that peak shaving is no longer appropriate.

Another of the remote modes 130 is the export-to-utility mode 136, in which the customer is allowed to generate power at the genset 30, and then provide that power back to the utility 20 (or the power grid), for which the customer will be paid. As with respect to the other remote modes 130, the entry into, and exiting from, the export-to-utility mode 136 by the controller 60 is again determined based upon one or more signals provided from the utility 20. Upon entry into the export-to-utility mode 136 by the controller 60, both the genset circuit breaker 80 and the utility circuit breaker 85 are closed to allow power flow.

At least two methods of operation in the export-to-utility mode 136 are possible. One method of exporting power is to load the genset 30 to a preset fixed (base-load) kilowatt level, and direct the surplus power to the power grid when the output power of the genset 30 exceeds local load requirements. In a second method, the operator is allowed to determine the amount of power that is directed to the power grid based upon the level of the load 40 and the capacity of the genset 30; although the output power of the genset is allowed to fluctuate depending upon load 40, the level of exported power remains constant.

In the present embodiment, the controller 60 is designed so that any remote mode 130 generally takes precedence over any local mode or modes 120. That is, whenever the controller 60 is in any of the local modes 120 and then receives one of the outside signal(s) discussed above that would trigger entry into one of the remote modes 130 if the controller was in the normal mode 121, the controller then proceeds to enter the appropriate remote mode 130. In alternate embodiments, other prioritization schemes can be employed.

In controlling the operation of the switchgear system 10 in the various local modes 120 and remote modes 130, the controller 60 specifically also controls the transfers and other switching operations of the circuit breakers 80, 85 during operation in each of those modes. As discussed in the Background of the Invention, there are at least three types of transfers in which the switching statuses of the genset circuit breaker 80 and the utility circuit breaker 85 are reversed in order to change the power source providing power to the load 40, namely, the closed transition transfer, the soft load transfer, and the open transition transfer.

With respect to the closed transition transfer, the transfer begins in an initial state in which either the genset circuit breaker 80 or the utility circuit breaker 85 is closed, and the other circuit breaker is open, such that power being provided to the load 40 comes from only one of the genset 30 or the utility 20. In order to allow closure of both circuit breakers 80, 85 at the same time, the controller 60 then controls the operation of the genset 30 so that the output voltage of the genset matches that currently being output by the utility 20 (or the power grid), and so that the frequency and phase of the voltage being output by the genset 30 matches that of the utility. If the initial state is one in which the utility 20 is providing all of the power to the load 40 and the genset 30 is initially off, the controller 60 additionally provides a command to turn on the genset 30.

Once the output of the genset 30 matches the power characteristics of the utility 20, the circuit breaker that was originally open can then be closed such that both the genset circuit breaker 80 and the utility circuit breaker 85 are closed simultaneously. At this time, either both the utility 20 and the genset 30 are providing power to the load 40, or the genset 30 is providing power to the utility 20 (in addition to supplying power to the load 40). After both circuit breakers 80, 85 have been closed for a period of time, the circuit breaker that was originally closed is then opened. Thus, if the initial state of operation was one in which the utility 20 was supply all the necessary power to the load 40, after the transfer, all of the power of the load 40 is being supplied by the genset 30, and vice-versa.

The soft load transfer is similar to the closed transition transfer except that the period of time during which both circuit breakers 80 and 85 are closed is longer than in the closed transition transfer. This allows the switchgear system 10 to have a greater amount of time to adjust the relative contributions of power by the utility 20 and the genset 30 to the load 40 so that the original power source is phased out and the new power source is phased in. A third transfer is the open transition transfer. To perform the open transition transfer, whichever one of the circuit breakers 80, 85 is initially closed is then opened prior to the closing of the other circuit breaker, such that there is a period of time in which no power flow is occurring, either from the utility 20 or from the genset 30. This open transition transfer has the disadvantage of including a period of time in which the load 40 is receiving no power.

Depending upon the programming that is currently being executed by the controller 60, operation in any of the emergency standby mode 122 and the interruptible rate modes 124, 132 can proceed in the manner of any one of the closed transition transfer, the soft transfer, and the open transition transfer, although the open transition transfer is seldom performed. With respect to the peak shaving modes 126, 134 and the export-to-utility mode 136, however, a full transfer of the load does not occur. Rather, the switchgear system 10 performs a different switching operation in which it proceeds from a state in which only one of the two circuit breakers 80, 85 (typically, the utility circuit breaker 85) is closed to a state in which both of the circuit breakers are closed. Nevertheless, in proceeding from the first state to the second state, the controller 60 still must accurately control the operation of the genset 30 so that its output voltage in terms of amplitude, frequency and phase matches that of the power from the utility 20.

Referring still to FIG. 2, the memory 54 of the OIT 50 also includes several software modules or programs. Among these is a Modbus™ serial communication module 140, which in the preferred embodiment governs communication over communication link 66 between the controller 60 and the OIT in accordance with the Modbus™ protocol. Further included within the OIT 50 is a screen graphics module 142, which includes software for controlling the operation of the touch screen 52, as well as a utility/diagnostic/miscellaneous module 144, which includes the BIOS of the OIT 50 and allows for the monitoring and processing of information within the controller 60, including "housekeeping" functions.

All of the modules 140, 142 and 144 are coupled by a databus 146 within the OIT 50. The internal databus 65 and the databus 146, as shown in FIG. 2, are meant to indicate the existence of communications between what are separately functioning programming modules that interrelate with one another and, therefore, require some form of communication between the modules; however, the internal databus 65 and databus 146 are meant to be exemplary of any one of a number of different types of communications, links or procedures that allow for the interaction and integration of the software and other information in the modules with one another.

As shown in FIG. 2, the plug-in card 58 is a memory card storing application software programs 148. When the plug-in card 58 is coupled to the switchgear system 10, particularly by way of plug 56, the OIT 50 has access to the stored application software programs 148. The application software programs 148 enable the OIT 50 to access information relating to certain of the local and remote modes 120, 130, to enable those particular modes of operation, and also to provide certain other access to the configuration of the switchgear system 10 as necessary.

While all of the necessary software programming for allowing operation in each of the local modes 120 and remote modes 130 described above resides in the software modules 100, 110 of the controller 60, in the preferred embodiment the controller 60 only causes the switchgear system 10 to operate in a subset of those modes of operation based upon signals communicated from the OIT 50, which are determined by the application software programs 148 stored on the particular plug-in card 58 that is plugged into the OIT. That is, the application software programs 148 of any given plug-in card 58 limit the operation of the controller 60 to a small subset of the local mode and remote modes of operation 120, 130, for example, limit operation to a single remote and a single local mode. The exact number of modes to which the operation of the controller 60 is limited will vary depending upon the embodiment, however, and in certain embodiments, all of the available local and remote modes can be accessed and enabled by way of the OIT when a "universal" plug-in card is utilized.

In the preferred embodiment, there are 12 different possible plug-in cards 58 with application software programs 148 allowing for access to and enabling different specific subsets of the local and remote modes of operation 120, 130. A first plug-in card 58 is designed to only allow the controller 60 to operate in the normal mode 121 and the emergency standby mode 122 of the local modes 120, and not to operate in any of the remote modes 130. A second plug-in card and a third plug-in card respectively only allow for operation in the normal mode 121, the emergency standby mode 122 and one or the other of the interruptible rate mode 124 and the peak shaving mode 126 of the local modes 120, respectively, and none of the remote modes. A fourth plug-in card, fifth plug-in card and sixth plug-in card each allow for operation in the normal mode 121 and the emergency standby mode 122 of the local modes 120, and additionally in a respective one of the interruptible rate mode 132, peak shaving mode 134, and export-to-utility mode 136 of the remote modes 130.

A seventh plug-in card, eighth plug-in card, and ninth plug-in card only allow for operation in the normal mode 121, the emergency standby mode 122 and the interruptible rate mode 124 of the local modes 120, and operation in a respective one of the interruptible rate mode 132, peak shaving mode 134 and export-to-utility mode 136 of the remote modes 130. A tenth plug-in card, eleventh plug-in card and twelfth plug-in card only allow for operation in the normal mode 121, the emergency standby mode 122, and the peak shaving mode 126 of the local modes 120 and a respective one of the interruptible rate mode 132, peak shaving mode 134, and export-to-utility mode 136 of the remote modes 130. Thus, by selecting and plugging in a particular plug-in card 58, a customer can cause the switchgear system 10 to operate in different modes of operation that are best suited to the customer's needs.

The present embodiment of the invention shows a switchgear system 10 that is a two-breaker switchgear system design, insofar as there are two circuit breakers 80, 85 that are controlled by the controller 60. However, in alternate embodiments, the switchgear system 10 can be a one-breaker design, including only a single circuit breaker, namely, circuit breaker 80, such that the controller 60 does not determine whether the utility 20 provides power to the load 40 but only determines whether the genset 30 provides power to the load.

Figure 3:
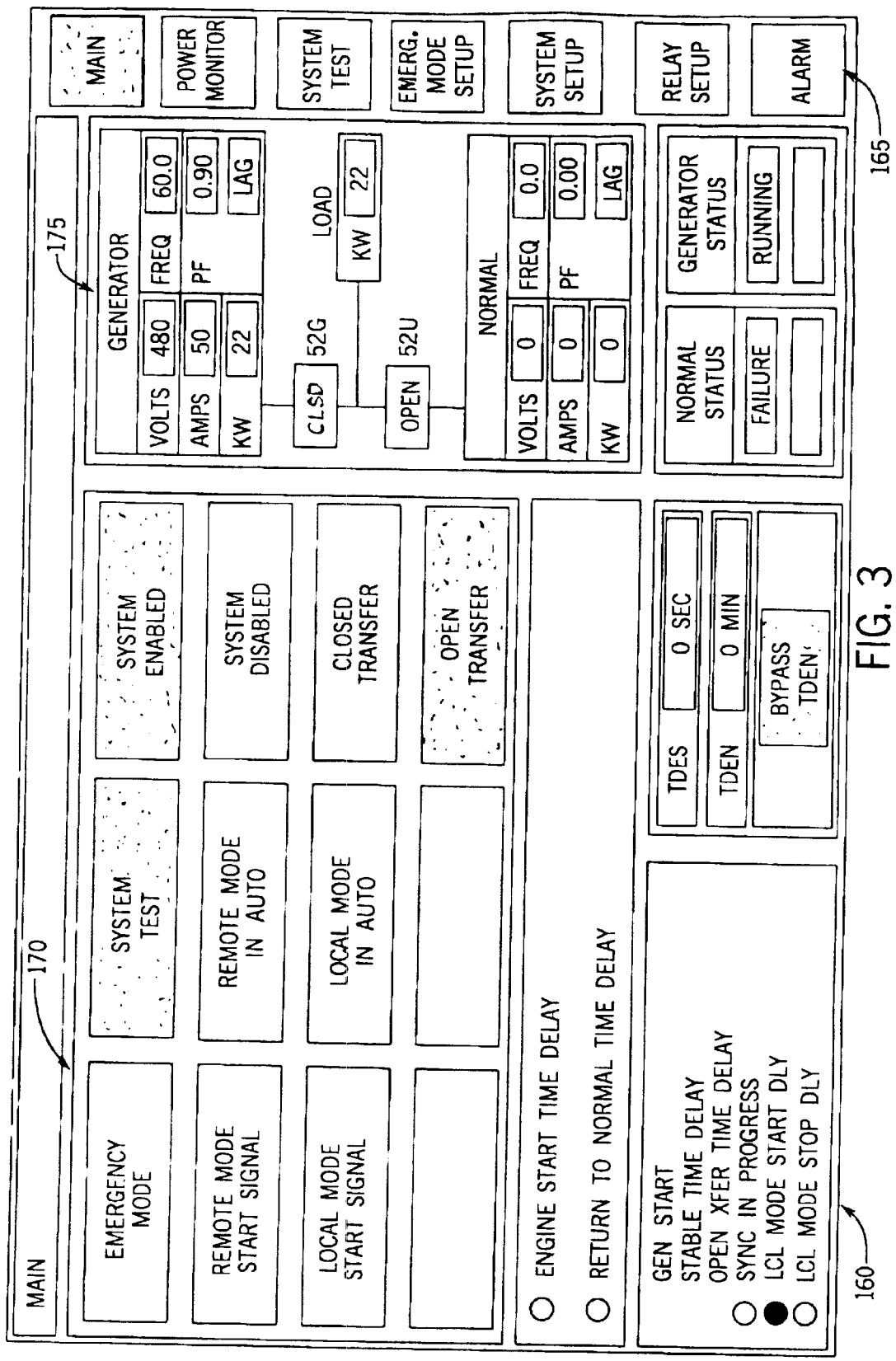
FIG. 3 is an exemplary screen of an operator interface terminal ("OIT") of the configurable switchgear system of FIG. 1.

Referring to FIG. 3, an exemplary screen 160 is shown that can be displayed on the touch screen 52 of OIT 50. Exemplary screen 160 is only one of several screens that can be selectively displayed by an operator of the switchgear system 10 by selecting from among multiple buttons 165 on the touch screen. In the screen 160, which is the main menu screen, a variety of information is displayed. Among the information displayed is the current mode of operation of the switchgear system 10. As shown, the present mode of operation is the emergency standby mode 122 of the local modes 120. Also, at a block 175, a variety of information concerning the power being provided or the power available from the utility 20 and the genset 30 is shown, as well as the total power required by the load 40. As presently displayed, the utility circuit breaker 85 is open and the genset circuit breaker 80 is closed. The information shown in the main menu screen 160 or any of the other screens that appear, depending upon which of the buttons 165 is selected, can vary depending upon the embodiment of the switchgear system 10.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A switchgear system comprising:
a first switch capable of electrically coupling a first power source and a load;
a second switch capable of electrically coupling a second power source and the load;
a control unit coupled to both the first and second switches, the control unit including a memory that stores software, wherein the control unit is capable of operating in at least two modes and controlling opening and closing of the first and second switches in accordance with those modes based upon the software; and
an operator interface coupled to the control unit, the operator interface being capable of receiving additional information that enables the operation of the control unit in at least one of the at least two modes.

2. The system of claim 1, wherein the operator interface includes a touch screen.

3. The system of claim 1, wherein the operator interface includes a port for receiving a plug-in card, wherein the plug-in card includes a memory in which the additional information is stored.

4. The system of claim 3, wherein the additional information includes at least one application software program, and wherein the operator interface further includes a memory storing at least a first software module concerning serial communications, a second software module concerning screen graphics on the operator interface, and a third software module concerning diagnostics information.

5. The system of claim 1, wherein the software within the memory of control unit includes PLC control logic software, binding set software, and configuration software.

6. The system of claim 5, wherein the PLC control logic software includes programs concerning operation of the control unit in a plurality of modes.

7. The system of claim 6, wherein the plurality of modes includes local modes and remote modes.

8. The system of claim 7, wherein the local modes include a normal mode, an emergency standby mode, an interruptible rate mode, and a peak shaving mode, and the remote modes include an interruptible rate mode, a peak shaving mode, and an export-to-utility mode.

9. The system of claim 5, wherein the memory includes a first software module that includes the PLC control logic software and a data table, and further includes a second software module that includes the binding set software, the configuration software and also binding set control logic software.

10. The system of claim 9, wherein the software of the second software module determines a plurality of discrete and analog output signals and processes a plurality of discrete and analog input signals.

11. The system of claim 1, wherein the control unit further includes plurality of protective relays and a plurality of input/output drivers that receive a plurality of discrete and analog input signals and transmit a plurality of discrete and analog output signals.

12. The system of claim 11, wherein the plurality of discrete and analog output signals include signals for controlling the operation of the second power source, the relays, and the opening and closing of the first and second switches.

13. The system of claim 1, further comprising a databus coupling the control unit and the operator interface, wherein the databus operates in accordance with the MODBUS protocol, and further comprising an internal databus coupling a processor, the memory and the input/output drivers within the control unit, wherein the internal databus operates in accordance with the LonWorks protocol.

14. The system of claim 1, wherein the control unit is capable of controlling the opening and closing of the first and second breakers in order to perform at least one of an open transition transfer, a closed transition transfer, and a soft load transfer.

15. The system of claim 1, wherein the control unit is capable of receiving a signal from a utility, and determining whether to change a switching status of the first and second switches in response to the signal.

16. The system of claim 15 wherein, when the control unit is operating in an interruptible rate mode that is a remote mode, and the control unit receives the signal from the utility, the control unit opens the first circuit breaker and closes the second circuit breaker so that all power supplied to the load comes from the second power source.

17. The system of claim 15 wherein, when the control unit is operating in a peak shaving mode that is a remote mode, and the control unit receives the signal from the utility, the control unit closes the second circuit breaker so that a portion of the power supplied to the load comes from the second power source.

18. The system of claim 15 wherein, when the control unit is operating in an export-to-utility mode that is a remote mode, and the control unit receives the signal from the utility, the control unit closes the second circuit breaker so that an amount of power is provided from the second power source toward a power grid.

19. A control system for controlling the switching status of a switch in a switchgear system, the control system comprising:

a first means for storing primary information concerning a plurality of modes of operation regarding the controlling of the switching status;

a second means for providing a signal to control the switching status in accordance with one of the plurality of modes, the second means providing the signal based upon a subset of the primary information corresponding to the one mode; and a third means capable of receiving secondary information from an outside source, the secondary information determining which subset of the primary information is the basis for the signal.

20. In a switchgear system, a method of controlling a switching status of two switches, the method comprising:

providing a controller with an interface, and an internal memory in which is stored primary software concerning a plurality of operational modes regarding the controlling of the switching status of the two switches;

coupling a first memory device including secondary software to the interface of the controller, wherein the secondary software causes an activation of a first subset of the primary software concerning a first of the operational modes;

generating a first control signal to change the switching status of at least one of the switches in accordance with the first subset of the primary software;

replacing, at the interface, the first memory device with a second memory device including tertiary software, wherein the tertiary software causes an activation of a second subset of the primary software concerning a second of the operational modes; and generating a second control signal to change the switching status of at least one of the switches in accordance with the second subset of the primary software.

* * * * *

UNITED STATES PATENT AND TRADEMARK OFFICE
CERTIFICATE OF CORRECTION

PATENT NO. : 6,633,799 B2  Page 1 of 1
DATED : October 14, 2003
INVENTOR(S) : Alexander Krakovich and Keith S. Ruh It is certified that error appears in the above-identified patent and that said Letters Patent is hereby corrected as shown below:

<u>Column 6,</u>
Line 36, "genset:" should be -- genset --.

Signed and Sealed this

Twenty-third Day of March, 2004

JON W. DUDAS
*Acting Director of the United States Patent and Trademark Office*